United States Patent
Van Loon et al.

(10) Patent No.: US 9,764,353 B2
(45) Date of Patent: Sep. 19, 2017

(54) METHOD OF PRODUCING A LAYER OF A VULCANIZED SILICONE RUBBER COMPOSITION HAVING AN IMPROVED ADHESION TO THE SUBSTRATE SURFACE

(71) Applicant: ABB Research Ltd., Zürich (CH)

(72) Inventors: Jan Van Loon, Kleindöttingen (CH); Marco Schneider, Baden (CH); Patrick Meier, Staufen (CH); Xavier Kornmann, Lauchringen (DE)

(73) Assignee: ABB Research Ltd., Zurich (CH)

( * ) Notice: Subject to any disclaimer, the term of this patent is extended or adjusted under 35 U.S.C. 154(b) by 1210 days.

(21) Appl. No.: 13/853,605

(22) Filed: Mar. 29, 2013

(65) Prior Publication Data

US 2013/0288062 A1 Oct. 31, 2013

Related U.S. Application Data

(63) Continuation of application No. PCT/EP2011/065509, filed on Sep. 8, 2011.

(30) Foreign Application Priority Data

Sep. 30, 2010 (EP) .................................... 10183115
Dec. 16, 2010 (WO) ................. PCT/EP2010/069965

(51) Int. Cl.
| | |
|---|---|
| B05D 5/12 | (2006.01) |
| B32B 7/12 | (2006.01) |
| C09J 183/02 | (2006.01) |
| C08L 83/04 | (2006.01) |
| C09J 5/02 | (2006.01) |
| C09D 183/14 | (2006.01) |
| B05D 3/06 | (2006.01) |
| C08K 3/00 | (2006.01) |
| C08G 77/20 | (2006.01) |
| C08G 77/12 | (2006.01) |
| C08K 3/08 | (2006.01) |
| C09D 5/00 | (2006.01) |
| C09D 183/04 | (2006.01) |

(52) U.S. Cl.
CPC .................. *B05D 5/12* (2013.01); *B32B 7/12* (2013.01); *C08L 83/04* (2013.01); *C09D 5/002* (2013.01); *C09D 183/04* (2013.01); *C09D 183/14* (2013.01); *C09J 5/02* (2013.01); *C09J 183/02* (2013.01); *B05D 3/067* (2013.01); *B05D 2202/00* (2013.01); *B05D 2203/30* (2013.01); *C08G 77/12* (2013.01); *C08G 77/20* (2013.01); *C08K 3/0016* (2013.01); *C08K 3/0091* (2013.01); *C08K 3/08* (2013.01); *C09J 2205/31* (2013.01); *Y10T 428/31663* (2015.04)

(58) Field of Classification Search
CPC ...... B05D 5/12; B05D 3/067; B05D 2203/30; B05D 2202/00
See application file for complete search history.

(56) References Cited

U.S. PATENT DOCUMENTS

| | | | | |
|---|---|---|---|---|
| 2,823,218 | A | * 2/1958 | Speier .................. | C07F 7/0879 252/573 |
| 4,598,134 | A | * 7/1986 | Hirai .................... | C09D 183/04 156/329 |
| 4,681,963 | A | 7/1987 | Lewis | |
| 4,705,765 | A | 11/1987 | Lewis | |
| 4,721,750 | A | * 1/1988 | Nakamura ........... | C09D 143/04 524/315 |
| 5,084,354 | A | 1/1992 | Krankkala et al. | |
| 5,106,939 | A | 4/1992 | Sumpter et al. | |
| 6,136,382 | A | 10/2000 | Kamen et al. | |
| 2003/0104224 | A1 | 6/2003 | Kuroda et al. | |
| 2003/0199603 | A1* | 10/2003 | Walker ................. | C03C 25/106 522/99 |
| 2005/0022688 | A1 | 2/2005 | Asada | |
| 2007/0059536 | A1* | 3/2007 | Fukaya .............. | C04B 35/4682 428/447 |
| 2008/0003370 | A1* | 1/2008 | Sweet .................. | C09D 183/04 427/394 |
| 2008/0138546 | A1* | 6/2008 | Soria ..................... | B41N 10/04 428/32.51 |

(Continued)

FOREIGN PATENT DOCUMENTS

| | | |
|---|---|---|
| CN | 1290281 A | 4/2001 |
| CN | 101418124 A | 4/2009 |

(Continued)

OTHER PUBLICATIONS

European Office Action issued in corresponding European Patent Application No. 11 755 316.4 dated Sep. 29, 2014.

(Continued)

*Primary Examiner* — Nicole M Buie-Hatcher
(74) *Attorney, Agent, or Firm* — Taft Stettinius & Hollister LLP

(57) ABSTRACT

A method of producing a layer of a UV-cured silicone rubber composition on a substrate surface, including applying a primer composition to the substrate surface and hardening the primer composition followed by applying a UV-curable silicone rubber composition, and UV-curing the curable silicone rubber composition. At least one UV-sensitive crosslinking catalyst selected from compounds which initiate and promote curing of UV-curable silicone rubber compositions, is added to the silicone primer composition in any desired sequence before, during or after hardening of the silicone primer composition.

27 Claims, No Drawings

(56) References Cited

U.S. PATENT DOCUMENTS

| | | | |
|---|---|---|---|
| 2008/0164264 A1* | 7/2008 | Fung | A47J 27/002 220/573.1 |
| 2008/0260957 A1 | 10/2008 | Yamada et al. | |
| 2008/0266746 A1* | 10/2008 | Handa | H01L 21/6831 361/234 |
| 2008/0280149 A1 | 11/2008 | Higuchi et al. | |
| 2010/0292361 A1 | 11/2010 | Koellnberger | |

FOREIGN PATENT DOCUMENTS

| | | | |
|---|---|---|---|
| CN | 101469249 A | 7/2009 | |
| DE | 10 2004 036 571 A1 | 3/2005 | |
| DE | 10 2008 000 156 A1 | 7/2009 | |
| EP | 0044673 A1 * | 1/1982 | C08K 5/057 |
| EP | 0347049 A2 * | 12/1989 | C08J 5/12 |
| EP | 0 781 823 A1 | 7/1997 | |
| EP | 2 385 085 A1 | 11/2011 | |
| JP | 11-100550 A | 4/1999 | |

OTHER PUBLICATIONS

Invitation Pursuant to Article 94(3) and Rule 71(1) EPC dated Mar. 4, 2014, issued by the European Patent Office in corresponding European Patent Application No. 11 755 316.4-1306. (4 pages).

International Search Report (PCT/ISA/210) issued on Jan. 25, 2012, by the European Patent Office as the International Searching Authority for International Application No. PCT/EP2011/065509.

Office Action (First Office Action) issued on May 14, 2014, by the State Intellectual Property Office, P.R. China, in corresponding Chinese Patent Application 201180057675.4, and an English translation of the Office Action. (28 pages).

\* cited by examiner

METHOD OF PRODUCING A LAYER OF A VULCANIZED SILICONE RUBBER COMPOSITION HAVING AN IMPROVED ADHESION TO THE SUBSTRATE SURFACE

RELATED APPLICATION(S)

This application claims priority as a continuation application under 35 U.S.C. §120 to PCT/EP2011/065509, which was filed as an International Application on Sep. 8, 2011 designating the U.S., and which claims priority to European Application No. 10183115.4 filed in Europe on Sep. 30, 2010. The entire contents of these applications are hereby incorporated by reference in their entireties.

FIELD

Disclosed is a method of producing a layer of a vulcanized silicone rubber composition on a substrate surface having an improved adhesion to the substrate surface. The vulcanized silicone rubber can be selected from high temperature vulcanized (HTV) and room temperature vulcanized (RTV) silicone rubbers, for example, from cured room temperature vulcanizing silicone rubbers selected from ultraviolet radiation (UV) cured room temperature vulcanizing silicone rubbers, such as cured liquid ultraviolet radiation room temperature vulcanizing silicone rubbers.

BACKGROUND INFORMATION

Silicone rubbers are used in the electrotechnical industry as electrical insulation for indoor and outdoor applications such as, for example, hollow core insulators, cable accessories, medium and high voltage surge arresters or vacuum interrupters. Both high temperature vulcanizing silicone rubbers (HTV-SR) and liquid silicone rubbers (LSR) are used for these applications. In the case of LSR, the material can be composed of two different components A and B, which are mixed together and afterwards thermally cured. Curing time plays a role in the total production time of these products and can vary between 15 minutes for small insulators up to 40 minutes or more for large insulators.

A faster way of producing electrical insulations is to use room temperature vulcanizing (RTV) silicone rubbers, including room temperature vulcanizing liquid silicone rubbers (RTV-LSR), which cure in the presence of ultraviolet radiation (UV). For example, the UV-curing of such UV-vulcanizable RTV silicone rubber compositions does not require or employ a heating step, and can occur within seconds to minutes. The use of UV vulcanizable RTV silicone rubber compositions, including room temperature vulcanizing liquid silicone rubbers, allows for the significant reduction of production times and therewith also production costs.

With regard to electrical applications of such UV-curable RTV silicone rubber compositions, it can be desirable for there to exist a strong adhesion between the cured silicone rubber composition and the substrate. If the adhesion is low, electric discharges can occur on the interfaces, which can lead to an electrical breakdown of the insulation or device.

For thermally cured silicones there exist primer compositions to improve adhesion of the thermally cured silicone rubber to the substrate. Individual primers can be selected depending on the substrate. Such primer compositions can be used in the form of liquid solutions containing compounds selected, for example, from hydrolysable silicates, hydrolysable titanates, reactive silanes and/or siloxanes, optionally together with an organic solvent. When the primer is applied to a substrate surface and is exposed to moist atmosphere at ambient or elevated temperature, a thin solid film is formed on the substrate surface.

In the case of UV-cured silicones, however, it has been shown that primer compositions do not provide sufficient adhesion to the substrate and, therefore, do not work properly, although these primers provide good results when applied together with thermally cured silicones. This is true for substrates such as metals, ceramics, glass, and rubber/glass composites as well as plastic materials. Use of thermally cured silicones can be disadvantageous because it can require either the development of new primer compositions or the introduction of an additional heat curing step into the production. The latter is a disadvantage for the industrial use of UV-cured silicones and limits the time and cost benefits of using UV-curing silicones.

SUMMARY

According to an exemplary aspect, a method of producing a layer of a UV-cured silicone rubber composition on a substrate surface is provided, the method comprising: applying a silicone primer composition to the substrate surface and hardening said silicone primer composition, followed by applying a UV-curable silicone rubber composition on the silicone primer composition, and UV-curing said UV-curable silicone rubber composition, to obtain an electrical insulator, wherein at least one UV-sensitive crosslinking catalyst which initiates and promotes curing of the UV-curable silicone rubber composition, is added to or applied on the silicone primer composition before, during or after hardening of said silicone primer composition, wherein the UV-sensitive crosslinking catalyst is formed from at least one metal selected from the group consisting of iron, ruthenium, osmium, cobalt, rhodium, iridium, nickel, palladium and platinum.

According to an exemplary aspect, a silicone primer composition is provided, suitable for promoting adhesion of a vulcanized silicone rubber composition to a substrate surface, wherein said silicone primer composition comprises at least one UV-sensitive crosslinking catalyst, wherein said at least one UV-sensitive crosslinking catalyst is formed from at least one metal selected from the group consisting of iron, ruthenium, osmium, cobalt, rhodium, iridium, nickel, palladium and platinum, wherein the at least one UV-sensitive crosslinking catalyst is capable of initiating and promoting vulcanization of a UV-curable silicone rubber composition.

According to an exemplary aspect, a method of producing an electrical insulator in a form of a layer of a vulcanized silicone rubber composition on a substrate surface is provided, the method comprising: applying a silicone primer composition to the substrate surface and hardening said silicone primer composition, followed by applying a UV-curable curable silicone rubber composition on the silicone primer composition, and curing said UV-curable curable silicone rubber composition, to obtain an electrical insulator, wherein at least one UV-sensitive crosslinking catalyst which initiates and promotes vulcanization of the UV-curable silicone rubber composition, is added to or applied on the silicone primer composition before, during or after hardening of said silicone primer composition, wherein the UV-sensitive crosslinking catalyst is formed from at least one metal selected from the group consisting of iron, ruthenium, osmium, cobalt, rhodium, iridium, nickel, palladium and platinum.

According to an exemplary aspect, an article is provided, comprising: a substrate; a layer formed from an exemplary silicone primer composition, and a layer formed from a silicone rubber composition.

According to an exemplary aspect, an electrical insulator formed from an exemplary method is provided.

According to an exemplary aspect, an electrical article comprising an exemplary electrical insulator is provided.

DETAILED DESCRIPTION

In an exemplary aspect, silicone primer compositions are combined before, during or after hardening with at least one UV-sensitive crosslinking catalyst. Such exemplary silicone primer compositions do not have the disadvantages described above. A UV-sensitive crosslinking catalyst is a UV-active crosslinking initiator compound which initiates and promotes crosslinking and vulcanization of curable silicone rubber compositions.

Using a silicone primer composition, which is combined before, during or after hardening, with at least one UV-sensitive crosslinking catalyst, can yield a product wherein an excellent adhesion of the cured silicone rubber, for example, a UV-cured silicone rubber, to the substrate surface is obtained without requiring an additional thermal curing step. This result is surprising, as UV-cured silicone rubbers already contain in the curable state a sufficient quantity of at least one UV-sensitive crosslinking catalyst.

The expression "silicone primer composition" as used herein means that the "primer composition" is suitable to be used together with a curable silicone rubber composition, for example, with a UV-curable silicone rubber composition, whereby said curable silicone rubber composition is applied onto the cured primer as an additional layer. The "silicone primer composition" does not necessarily contain a silicone compound. The expressions "curable", "vulcanizable" and "crosslinkable" as used herein are equivalent.

The silicone primer composition according to an exemplary aspect is a silicone primer composition to which at least one UV-sensitive crosslinking catalyst has been added in any desired sequence, for example, before, during or after hardening of said silicone primer composition.

By first adding a hardened silicone primer composition to the substrate surface, to which at least one UV-sensitive crosslinking catalyst has been added in any desired sequence (for example, before, during or after hardening the hardenable silicone primer composition), a tight and strong adhesion is obtained between the cured silicone rubber and the substrate surface. For room temperature vulcanizing silicone rubbers, such as UV-cured room temperature vulcanizing silicone rubbers, no additional thermal curing step is required.

For example, the present disclosure refers to a method of producing a layer of a UV-cured silicone rubber composition on a substrate surface, said UV-cured silicone rubber composition having an improved adhesion to the substrate surface. An exemplary method comprises applying a silicone primer composition to the substrate surface and hardening said silicone primer composition followed by applying thereupon a UV-curable silicone rubber composition, and UV-curing said curable silicone rubber composition, whereby the electrical insulator is obtained, wherein at least one UV-sensitive crosslinking catalyst selected from compounds which initiate and promote curing, for example, crosslinking, of UV-curable silicone rubber compositions, is added to the silicone primer composition in any desired sequence before, during or after hardening of said silicone primer composition.

For example, when a UV-curable silicone rubber composition is subsequently added onto said hardened silicone primer composition, no additional thermal curing step is required when curing said composition.

Said UV-curable silicone rubber composition applied to the surface of the hardened silicone primer composition can be selected from room temperature UV-curable silicone rubber compositions, including room temperature UV-curable liquid silicone rubber compositions. Upon curing with UV radiation, these compositions can yield the cured/vulcanized composition.

Also disclosed is an exemplary silicone primer composition, suitable for improving the adhesion of UV-vulcanized silicone rubber compositions to various substrate surfaces, wherein said silicone primer composition comprises at least one UV-sensitive crosslinking catalyst, said at least one UV-sensitive crosslinking catalyst being selected from compounds which initiate and promote curing, for example, crosslinking, of UV-curable silicone rubber compositions.

The layer of the vulcanized silicone rubber composition on the substrate surface can be an electrical insulator, for example, a high voltage electrical insulator. For example, disclosed is a method of producing an electrical insulator including a layer of a vulcanized silicone rubber composition on a substrate surface, said vulcanized silicone rubber composition having an improved adhesion to the substrate surface, said method comprising applying a silicone primer composition to a substrate surface and hardening said silicone primer composition followed by applying thereupon a UV-curable silicone rubber composition, and curing said curable silicone rubber composition by UV-curing, whereby the electrical insulator is obtained, wherein at least one UV-sensitive crosslinking catalyst selected from compounds which initiate and promote curing, for example, crosslinking, of UV-curable silicone rubber compositions, is added to the silicone primer composition in any desired sequence before, during or after hardening of said silicone primer composition.

According to an exemplary aspect, electrical articles are provided comprising an exemplary insulator.

Exemplary silicone primer compositions, for example, are made from hydrolysable silicates, hydrolysable titanates, reactive, for example, hydrolysable, silanes and/or siloxanes, optionally together with an organic solvent.

Hydrolysable silicates which can be used in said primer composition include, for example, tetra[($C_1$-$C_8$)alkyl]-orthosilicates, such as tetraethyl-silicate, tetrapropyl-orthosilicate or tetrabutyl-orthosilicate; or ($C_1$-$C_8$)alkoxy-($C_1$-$C_8$)alkyl-orthosilicates, such as butoxy-ethyl-orthosilicates, and similar related compounds.

Hydrolysable titanates which can be used in said primer composition include, for example, tetra[$C_1$-$C_8$)alkoxy]-titanates, such as tetra[propoxy]-titanate or tetra-[n-butoxy]-titanate; or ($C_1$-$C_8$)alkoxy-($C_1$-$C_8$)alkyl-titanates, such as butoxy-ethyl-titanates, and similar related compounds.

Reactive silanes which can be used in said primer composition include, for example, tetraalkoxysilanes, trialkoxyalkylsilanes or dialkoxyalkylsilanes of the formula: [($C_1$-$C_4$)alkoxy]$_x$Si[($C_1$-$C_4$)alkyl]$_{4-x}$, wherein x is 2, 3 or 4, for example, 3 or 4; for example, tetraalkoxysilanes such as tetraethoxysilane, tetrapropoxysilane; or trialkoxy-monoalkylsilane such as triethoxymethylsilane or tripropoxymethylsilane, and similar related compounds.

Examples of reactive siloxanes which can be used in said primer composition include liquid and low viscosity polydimethylsiloxanes, such as polydimethylsiloxanes containing at least one reactive group per molecule, such as an alkoxy group or a hydroxy group or a vinyl group or an epoxy group or another suitable reactive group, for example, at least two such groups per molecule or more, for example, selected from ethoxy, propoxy or butoxy groups. Such reactive siloxanes can be linear, branched or cyclic and can contain 2-8 siloxy groups per molecule. Such alkoxysiloxanes optionally can additionally contain one or more vinyl groups or one or more hydrosilane groups.

Examples of solvents to be used in said primer composition are aliphatic hydrocarbons, especially linear ($C_4$-$C_8$)-alkanes, ($C_4$-$C_8$)-isoalkanes; ketones such as acetone, or benzene, toluene, xylene, ethylbenzene and related compounds.

Different silicone primer compositions which are commercially available can be used. For example, a silicone primer composition from Dow Corning contains tetrapropyl-orthosilicate, butoxy-ethyl-orthosilicate, tetrabutyl-titanate and octamethyl-trisiloxane. Other silicone primers contain reactive silanes and silicones in solvents such as acetone and isoalkanes. Another commercially available silicone primer comprises tetrapropyl-orthosilicate, tetra-[n-butoxy]-titanate; tetrakis(2-methoxyethyl)-orthosilicate, and solvents such as xylene, 2-methoxyethanol and ethylbenzene.

In an exemplary embodiment, the silicone primer composition comprises at least one UV-sensitive crosslinking catalyst which is added to the silicone primer composition in any desired sequence, before, during or after hardening. Any suitable UV-sensitive crosslinking catalyst can be used. Such UV-sensitive catalysts for effecting the addition of silicone hydride compounds to vinyl-substituted silanes and siloxanes, for example, hydrosilylation of 2-part silicone rubber compositions, can include palladium and/or platinum catalysts.

UV-sensitive crosslinking catalysts can be made from metals of group VIII of the periodic table of elements, for example, ruthenium (Ru), osmium (Os), cobalt (Co), rhodium (Rh), iridium (Ir), nickel (Ni), palladium (Pd) and platinum (Pt), and represent heterogeneous forms as well as chemical compounds and complexes therefrom. Exemplary are catalysts made from rhodium, palladium and platinum, for example, from palladium and platinum, in heterogeneous forms or as chemical compounds or complexes thereof.

Exemplary UV-sensitive crosslinking catalysts are heterogeneous forms of these metals, by using the metal per se or compositions wherein the metal is deposited on a carrier material, such as deposited on charcoal, silica or alumina, for example, on alumina and especially on gamma-alumina. As starting materials, for example, $H_2PtCl_6$, $PdCl_6$ or $RhCl_6$ can be used and reduced to the metal, so that corresponding metal particles are deposited on the carrier material, with an average particle size which can be in a nano-size range. Such heterogeneous platinum catalysts are examples.

Exemplary UV-sensitive crosslinking catalysts include chemical compounds and complexes of metals of group VIII of the periodic table of elements, as mentioned above, used as homogeneous catalysts. Exemplary are platinum(0) and platinum(II) compounds, for example, in the form of complexes.

Exemplary platinum containing catalysts are chloroplatinic acid ($H_2PtCl_6$) in anhydrous form or as hexahydrate, or platinum Pt(0) or Pt(II) complexes which have ligands selected from halides, for example, chlorine; ($C_1$-$C_8$)alkyl radicals; ($C_1$-$C_8$)-aliphatic unsaturated radicals, for example, 1,5-cyclooctadiene ($C_8H_{12}$), such as ($C_8H_{12})_2PtCl_2$, or styrene, yielding (styrene)$_2PtCl_2$.

Examples also include platinum complexes which are obtained by reacting chloroplatinic acid and complexes thereof with an aliphatic unsaturated organosilane or an aliphatic unsaturated organopolysiloxane compound, such as a vinylsilane or vinyl groups containing organopolysiloxane. Such hydrosilylation catalysts are described, for example, in U.S. Pat. Nos. 4,681,963, 4,705,765, and 5,106,939, the contents of which are incorporated herein by reference.

Examples of compounds to be used as UV-sensitive crosslinking catalysts on the basis of palladium (Pd) are Pd(0)-compounds such as tetrakis(triphenylphosphino)palladium and the corresponding complexes with the ligands tri-(2-tolyl)phosphine, tris-(2-furyl)phosphine, tris(tert.-butyl)phosphine, or the two-valent ligands dppm [1,1-bis(diphenylphosphinomethane)] or dppe [1,2-bis-(diphenylphosphino)ethane]. Pd(II)-compounds, such as $PdCl_2$, Pd(dppe)$Cl_2$, Pd(OAc)$_2$, Pd(dppe)(OAc)$_2$, π-allyl-Pd-complex, can also be used. Further complexes that can be used include: di-acetylacetonate complexes of Pd, Pt or Ni, and trimethyl-(cyclopentadienyl) complexes of Pt(IV), optionally with different side groups. Such analogous complexes made from metals of group VIII of the periodic table of elements, as mentioned above, can be made from ruthenium (Ru), osmium (Os), cobalt (Co), rhodium (Rh), iridium (Ir), nickel (Ni), palladium (Pd) and platinum (Pt), for example, made from palladium and platinum, and as analogous compounds made from platinum. Such compounds can be used within the scope of the present disclosure. Further UV-sensitive crosslinking catalysts can be used such as those described in DE 10 2004 036 571 A1 and DE 10 2008 000 156 A1, the contents of which are incorporated herein by reference.

For example, at least one of such UV-sensitive hydrosilylation crosslinking catalyst is added to the silicone primer composition in the hardenable or hardened state, so that the silicone primer composition comprises said UV-sensitive hydrosilylation crosslinking catalyst in amounts within the range of 1 ppm to 5000 ppm, for example, within the range of 5 ppm to 1000 ppm, for example, 50 ppm to 500 ppm, for example, about 300 ppm, calculated to the weight of metal contained in the catalyst and the weight of the silicone primer composition, calculated without solvent(s). In an exemplary embodiment, higher amounts of UV-sensitive crosslinking catalyst can be added if this is indicated.

The silicone primer composition is added to a substrate surface which can be degreased and cleaned. Any suitable method of cleaning can be employed. The solvent optionally contained in the silicone primer composition evaporates and the reactive components react with atmospheric humidity to form a uniform dry film. The film is allowed to completely dry and to form a dry hardened film. This film, comprising at least one UV-sensitive hydrosilylation crosslinking catalyst as defined herein above, is then coated with the vulcanizable silicone rubber composition, for example, with a UV vulcanizable silicone rubber composition.

High temperature and low temperature vulcanizable silicone rubber compositions are available and can be used. UV-curable silicone rubber compositions are also available and can comprise a two-component system, for example, which includes at least an organopolysiloxane with at least one alkenyl group (—CH=CH$_2$) per molecule and at least an organohydrogenpolysiloxane with at least one ≡SiH-group per molecule. In order to activate the crosslinking reaction, for example, the addition reaction between the alkenyl group and the ≡SiH-groups, the composition comprises a UV-sensitive crosslinking catalyst.

Exemplary UV-curable silicone rubber compositions can range in consistency from a liquid to a paste and can contain (a) at least an organopolysiloxane with an average of at least two alkenyl groups per molecule, said polysiloxane being linear, branched or cyclic or a mixture of such polysiloxanes; (b) at least one organohydrogenpolysiloxane, for example, with an average of at least two ≡SiH-groups per molecule, said polysiloxane being linear, branched or cyclic or a mixture of such polysiloxanes, and (c) a catalytic amount of at least one UV-sensitive crosslinking catalyst as defined herein above (as a component of the primer composition), optionally dissolved in a suitable solvent such as toluene, ($C_4$-$C_8$)-isoalkanes and similar compounds.

The molar ratio of the of the ≡SiH-groups to the alkenyl groups present in the UV vulcanizable silicone rubber composition can be within a range of about 1.5:1 to 4.5:1; for example, a range of 1.8:1 to 2.5:1; for example, a range of at least 2.0:1.

The UV vulcanizable hardenable silicone rubber compositions can contain further suitable additives such as fillers, stabilizers and/or silicon oils.

Organopolysiloxane with an average of at least two alkenyl groups per molecule [component (a) as mentioned above], are available per se. Examples of such organopolysiloxanes correspond to compounds of formula (I) or a mixture of compounds of formula (I):

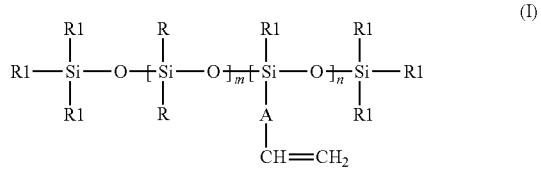

wherein
R independent of each other is ($C_1$-$C_8$)-alkyl or phenyl, for example, ($C_1$-$C_4$)-alkyl, for example, methyl;
$R_1$ independent of each other has one of the meanings of R or is a residue of formula -A-CH=$CH_2$;
A is a residue —$(C_sH_{2s})_p$—, for example, —$[(CH_2)_s]_p$—, wherein
s is 1 to 6, for example, 1;
p is zero or one;
m is zero to 5000, for example, an average value of 20 to 5000, for example, 50 to 1500;
n is zero to 100, for example, an average number of 2 to 100, for example, 2 to 20;
wherein the compound of formula (I) or the mixture of compounds of formula (I), has an average of at least two alkenyl groups of the formula -A-CH=$CH_2$ per molecule, and the groups of the formulae —[Si(R)(R)O]— and —[Si($R_1$)(A-CH=$CH_2$)O]— are arranged in an arbitrary sequence.

Compounds of formula (I) can be a mixture of compounds of formula (I) with different molecular weights. The alkenyl group [-A-CH=$CH_2$] can be, for example, vinyl, allyl, 3-butenyl, 4-pentenyl, for example, vinyl (wherein p=zero). The terminal —[Si($R_1$)$_3$]— groups, for example, independent of each other, stand for dimethylvinylsilyl, wherein n can be zero.

The organopolysiloxanes of component (a), for example, of formula (I), can have a viscosity within the range of 0.5 to 30,000 Pas, for example, within the range of 1 to 500 Pas, for example, within the range of 1 to 100 Pas, measured according to DIN 53 019 at 20° C. The sum of [m+n] can be in the average range of 20 to 5000, for example, within the average range of 50 to 1500.

Organopolysiloxane with an average of at least two ≡SiH-groups per molecule, [component (b) as mentioned above], are available per se. For example, component (b) comprises at least a linear, branched or cyclic organohydrogenpolysiloxane with an average of at least two ≡SiH-groups per molecule and can correspond to compound of formula (II) or a mixture of compounds of formula (II):

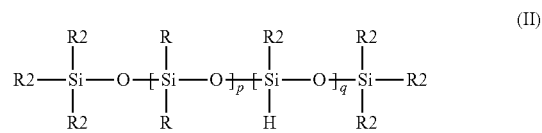

wherein
R independent of each other is ($C_1$-$C_8$)-alkyl or phenyl, for example, ($C_1$-$C_4$)-alkyl, for example, methyl;
$R_2$ independent of each other has one of the meanings of R or is hydrogen;
p is zero to 5000, for example, an average value of 20 to 5000, for example, 50 to 1500;
q is zero to 60, for example, an average number of 2 to 60, for example, 2 to 30;
wherein the compound of formula (II) or the mixture of compounds of formula (II) has an average of at least two ≡SiH-groups per molecule, and the groups of the formulae —[Si(R)(R)O]— and —[SiH($R_2$)O]— are arranged in an arbitrary sequence.

Compounds of formula (II) can be a mixture of compounds of formula (II) with different molecular weights. The terminal —[Si($R_2$)$_3$]— groups, for example, independent of each other stand for dimethylhydrogensilyl, whereby q can be zero. The organopolysiloxanes of component (b) and of formula (II) can have a viscosity within the range of 0.1 to 5 Pas, measured according to DIN 53 019 at 20° C.

Component (b) can represent or comprise a cyclic organohydrogenpolysiloxane. In this case, two terminal substituents $R_2$ of two different terminals of the molecule form together an oxygen atom. The molecule of compound (II) in this case is composed of —[Si(R)(R)O]— units and of —[SiH($R_2$)O]— units or only of —[SiH($R_2$)O]— units, which form the ring structure. Such a cyclic molecule can be composed of 4 to 8 of such units, for example, of an average of 4 of such units corresponding to the formula [—SiH($R_2$)O—]$_4$.

The UV-sensitive crosslinking catalyst added to the UV-curable silicone rubber compositions is independent from the UV-sensitive crosslinking catalysts added to the silicone primer composition. In an exemplary embodiment, the same UV-sensitive crosslinking catalyst is added to both compositions.

The UV vulcanizable silicone rubber composition contains the UV-sensitive crosslinking catalyst in amounts within the range of 1 ppm to 5000 ppm, for example, within the range of 5 ppm to 1000 ppm, for example, 50 ppm to 500 ppm, for example, about 300 ppm, calculated to the weight of metal contained in the catalyst and the sum of the weight of component (a) and component (b), calculated without solvent(s).

In light of the present disclosure, the ordinarily skilled person is able to conduct appropriate handling, treatment, mixing and application of the components of the UV hardenable silicone rubber composition.

The silicone primer composition can also be used together with other available UV-vulcanizable silicone rubber compositions such as curable release coatings which are based on polydimethylsiloxane rubbers that have been functionalized with polymerizable acrylate or epoxy groups or which contain such polymerizable monomeric or oligomeric forms dissolved in the polysiloxane rubber.

In an exemplary embodiment, for curing the UV-curable silicone rubber composition applied onto the solidified silicone primer composition, the UV-curable silicone rubber composition can be exposed to UV-irradiation, for example, UVA and/or UVB light, within the range of about 200 nm to about 800 nm and with an irradiation energy of, for example, about 1200 mJ/cm$^2$. As a UV source, any suitable lamp can be used such as, for example, Aetek Model QC 1202/N UV processor containing two 200 Watt/inch medium pressure mercury vapor lamps or a fusion system irradiator containing one 300 Watt/inch-bulb.

An exemplary embodiment is the combined use of UV-irradiation and IR-irradiation, optionally together with ultrasound, for vulcanizing the UV-curable silicone rubber composition applied onto the hardened silicone primer composition. For example, mercury vapor lamps are suitable to combine UV-irradiation with IR-irradiation, as mercury vapor lamps partially irradiate also in the IR range. The application of a separate IR source can be useful with reference to the effect of improved cure and bonding of the silicone primer composition. Optionally, the IR source can be applied before adding the UV-curable silicone rubber composition to the hardened primer and before applying UV-irradiation.

As a substrate, surfaces of metals, glass, ceramics, or synthetic polymers can be used. For example, surfaces of metals such as aluminum, aluminum alloys, for example, AlMgSi-alloys, chromium/nickel-steels or brass, can be used.

EXAMPLES

Disclosed are various examples of the disclosure. The following describes experiments that were performed and results that were obtained.
Materials and Sample Preparation The following substrates were used to test the adhesion of the vulcanized UV-vulcanizable silicone rubber composition: aluminum, stainless steel and ceramic (glass coated). The substrates were pre-conditioned by grinding with a scotch bright to roughen the surface. Afterwards, the substrates were cleaned with acetone for ten minutes in an ultrasonic bath. After rinsing with fresh acetone, the substrates were dried and stored in closed boxes until usage.
Used Materials For the evaluation there were used commercially available primers and a UV-curable silicone rubber composition sold by the company Momentive Ltd. Table 1 gives an overview of such materials.

TABLE 1

List of materials used

Materials:

| | |
|---|---|
| UV curing silicone rubber | TP 3754, obtained from Momentive Ltd. |
| Primer | G 790, obtained from Wacker Chemie GmbH |
| Primer | OSi 1200, obtained from Dow Corning Ltd. |
| Primer | HV 1860/120, obtained from Dow Corning Ltd. |

TABLE 1-continued

List of materials used

Materials:

| | |
|---|---|
| Primer | Primer No. 3, obtained from ACC Silicone Ltd. |
| Primer | SP-270, SP-120, SP-135, obtained from NuSil Primer Ltd. |

TP 3754: a UV vulcanizable two-component organopolysiloxane composition with an organovinylpolysiloxane component and an organohydrogenpolysiloxane component, containing about equal molar amounts of vinyl groups and ≡SiH-groups; containing a platinum based UV-sensitive crosslinking catalyst.

G 790: Main components: $C_7$-$C_{10}$ isoalkanes (>75%), titanium tetrabutanolate (<10%), toluene (<5%), tetraethyl silicate (<5%).

OSi 1200: aliphatic solvents (CAS-No. 64742-89-8): 85%; tetrapropylorthosilicate: 5.0%; titaniumtetrabutanoleate: 4.9%; tetrakis(2-methoxy)orthosilicate: 4.9%; other solvents: ad 100% b.w.

HV 1860/120: Naphta (85%), Xylol (6.8%), Tetrapropylorthosilicate (5.0%), Titantetrabutanolat (4.9%), Tetrakis(2-methoxyethyl)orthosilicate (4.9%). 2-Methoxyethanol (<=3.0%)

Primer No. 3: $C_9$-$C_{12}$ Isoalkanes (60-100%), Tetraaethyl silicate (10-30%), Tetra-n-butoxy titanate (5-10%).

SP-270, SP-120, SP-135: Main components: Naphta 60-80%, other components below reportable levels.

Example 1

Primer Preparation and Application

The experiments used commercially available primers from different suppliers (See Table 1). To these primers, a UV activator of the family of platinum and/or palladium based compound (for example, heterogeneous platinum catalyst deposited on gamma-alumina; trimethyl-(cyclopentadienyl)complex of Pt(IV); Platinum(II)acetylacetonate (from Fluka AG); or $H_2PtCl_6$) was added in an amount of 3% by weight of UV-activator added, calculated to the weight of the primer, excluding the solvent. The primer mixtures thus obtained were kept in the dark until usage.

The primers each time were applied manually with a brush to the substrate according to the manufacturer's instructions. A uniform thin single layer of primer was applied with a clean brush. Afterwards they were stored for 1-2 hours at room temperature under shaded conditions and at a relative humidity of 30-60% (no direct sun exposure) for activation.
Curing A UV-curing silicone rubber layer (TP 3754, of Momentive Ltd.) with a thickness of 3-5 mm was applied to the primed substrate and immediately subjected to UV light for 3 minutes.

The light source used was a Dymax Light Welder® 5000-EC, with light shield and zip shutter. It had a 400 W power supply and an iron doped Mercury bulb ("D-bulb"), providing a UV spectra in the range of 260 nm to 460 nm.

Before performing the adhesion test, the samples were kept under room conditions for at least 24 hours.
Evaluating the Adhesion The adhesion was assessed by a manual peel test of the applied silicone. The testing was performed as follows. With the use of a razor blade, a strip of silicone was separated from the substrate along the substrate-silicone interface so that a flap of a few centimeters was obtained. Afterwards, the flap was pulled on, in a direction parallel to the substrate surface and in a direction of the still adherent silicone. Depending on the failure mode, the adhesion was categorized into 3 different levels, as follows:

zero=no adhesion, the silicone strip can be removed without breaking and without visual residuals on the substrate.

1=partial adhesion, the silicone strip can be partially pulled off, but with some visual silicone residuals on the substrate.

2=good adhesion, the silicone strip breaks in cohesive failure. The adhesion force is stronger than the silicone strength.

Results

The adhesion was evaluated by a manual peel test as described above. Different commercially available primers have been used as listed in Table 1. All of them are suitable for thermal cured silicones. Some of them are especially tailored to bond well to aluminum substrates, and others are tailored to bond to steel and ceramic. In Table 2, adhesion results are shown for the primers intended for aluminum surfaces. In Table 3, adhesion results are shown for the primers intended for steel and ceramic substrates. As a comparison, the results obtained with the same primer, but modified in accordance with exemplary aspects by adding a UV activator thereto, are shown.

The results show that a significant improvement of the adhesion of the silicone to the substrate surface is achieved when the primer contains a UV activator. These results indicate that adding a UV curing activator to commercially available primers surprisingly improves the adhesion significantly. Further, these benefits are achieved without the need of a thermal heating step.

TABLE 2

Adhesion levels to aluminum substrates without and with the addition of UV activator

| | Aluminum | |
|---|---|---|
| Primer | no UV catalyst in the primer | addition of UV catalyst to the primer |
| G 790 | zero | 1 |
| OSi 1200 | zero | 2 |
| HV 1860/120 | zero | 2 |

TABLE 3

Adhesion levels to steel and ceramic substrates without and with the addition of UV activator

| | Steel | | Ceramic | |
|---|---|---|---|---|
| primer | no UV catalyst in the primer | addition of UV catalyst to the primer | no UV catalyst in the primer | addition of UV catalyst to the primer |
| G 790 | 0 | 1 | 0 | 1 |
| No. 3 | 0 | 2 | 0 | 2 |
| SP270 | 1 | 2 | 0 | 2 |
| SP120 | 0 | 2 | 0 | 2 |
| SP135 | 0 | 2 | 0 | 2 |

Additional experiments with IR free UV light ("cold"-UV light)

Additional experiments were carried out by the usage of a "cold"-UV-light source, using a LED lamp (Wavelength: 365 nm, "starfire", supplied by Phoseon). In contrast to a mercury lamp, the LED does not irradiate IR light and therefore the sample is only slightly heated up. Two primers were used as shown in Table 4.

TABLE 4

List of used materials for experiments with the LED lamp.

Materials:

| | |
|---|---|
| UV curing silicone rubber | TP 3754, obtained from Momentive Ltd. |
| Primer | Bonding Agent TP 2 3980, obtained from Momentive Ltd. |
| Primer | Primer No. 3, obtained from ACC Silicone Ltd. |

Bonding Agent TP 2 3980: Cristal Oil (50-100%), Cyclosiloxane ester (10-20%), 1,2,4-Trimethylbenzol (1-2.5%), 1,3,5-Trimethylbenzol (0.3-2-5%), Naphthalene (0.1-0.3%).

There were added to the primer 300 ppm of Pt(II) in the form of a di-acetylacetonate complex dispersed in dichloromethane. The sample preparation, curing and evaluation was performed in the same way as described above.

The obtained results are shown in Table 5. It can be seen that it is possible to obtain, with cold UV light, a positive effect on adhesion as with a mercury lamp.

TABLE 5

Adhesion levels to steel und ceramic substrates without and with the addition of UV activator and curing with LED lamp.

| | Steel | | Ceramic | |
|---|---|---|---|---|
| primer | no UV catalyst in the primer | addition of UV catalyst to the primer | no UV catalyst in the primer | addition of UV catalyst to the primer |
| No. 3 | 0 | 1-2 | 0 | 2 |
| TP 2 3980 | 0 | 2 | 1 | 2 |

An improved adhesion of UV-cured silicones on substrates was achieved which is clearly better than the adhesion obtained with commercially available primers at room temperature.

No thermal curing step for the primer is required. This yields a decrease of processing steps and therewith an increase of productivity.

This can enable the use of UV cured silicones for electric applications where, for example, inserts are required.

Example 2

Example 2 illustrates the method of first applying a primer composition (not containing a UV-catalyst) onto the surface and hardening said primer composition. Then the UV-catalyst is added with subsequent application of the UV-curable silicone layer.

Materials and Sample Preparation

The following substrates were used to test the adhesion of the vulcanized UV-vulcanizable silicone rubber composition: stainless steel and ceramic (glass coated). The substrates were pre-conditioned by grinding with a scotch bright to roughen the surface. Afterwards, the substrates were cleaned with acetone for ten minutes in an ultrasonic bath. After rinsing with fresh acetone, the substrates were dried and stored in closed boxes until usage.

Used Materials

For the evaluation, commercially available primers and a UV-curable silicone resin compositions were used. Table 6 gives an overview of the materials.

TABLE 6

List of used materials:

| Materials | Supplier | Function |
|---|---|---|
| TP3754 | Momentive Ltd. | UV curable silicone |
| Bonding Agent TP 2 3980 | Momentive Ltd. | Primer |
| Primer No. 3 | ACC Silicone | Primer |

Primer Preparation and Application

Step I: For the performed experiments, commercially available primers from two different suppliers and a UV-curable silicone composition (Table 6) were used. The primers were applied manually to the cleaned surface with a brush according to the manufacturers' instructions. Afterwards, they were allowed to dry for 30 to 60 minutes at ambient temperature.

Step II: In a second step, a solution of Platinum(II) acetylacetonate (from Fluka AG), dissolved in dichloromethane was applied with a brush. The concentration of the Platinum(II) acetylacetonate in dichloromethane was 0.6 wt %.

Curing: After the substrate treatment according to step I and step II, a silicone layer of 3-5 mm was applied to the primed substrates. The substrates were then immediately subjected to LED UV-light for 3 minutes (emitted wave length: 365 nm).

Description of Samples

Three sets of experiments were carried out using in each case steel and ceramic substrates, but varying the preparation method:

In Experiment I, the primer was applied as described in step I. Afterwards, the substrate was heated up to 90° C. and the UV-curing silicone was applied.

In Experiment II, the primer was applied as described in step I. Afterwards, the UV-curing silicone was applied at room temperature, without heating-up of the substrate.

In Experiment III, the primer was applied as described in step I and step II. Afterwards, the UV-curing silicone was applied at room temperature, without heating up of the substrate. The substrates were then subjected to LED UV-light for 3 minutes (emitted wave length: 365 nm).

Evaluating the Adhesion

The adhesion was assessed by a manual peel test, as defined herein above under "Evaluating the adhesion."

Results

The two different commercially available primers used are suitable for thermal cured silicones and are made to bond to steel and ceramic substrates. In Table 7 and Table 8, the adhesion results on steel substrates and on ceramic substrates are shown.

TABLE 7

Adhesion levels to steel substrates

| Primer | Experiment I Preparation according Step I and cured at 90° C. | Experiment II Preparation according Step I and cured at room temperature | Experiment III Preparation according step I & step II and UV-cured at room temperature |
|---|---|---|---|
| TP 3980 | 2 | 0 | 2 |
| Primer No. 3 | 2 | 0 | 1-2 |

TABLE 8

Adhesion levels to ceramic substrates

| Primer | Experiment I Preparation according Step I and cured at 90° C. | Experiment II Preparation according Step I and cured at room temperature | Experiment III Preparation according step I & step II and UV-cured at room temperature |
|---|---|---|---|
| TP 3980 | 2 | 1 | 2 |
| Primer No. 3 | 1-2 | 0 | 1-2 |

From the results, the following conclusions can be drawn:
1. If heating up the substrates, both primers work well with silicone (Experiment I).
2. If not heating up the substrates, the primers work poorly with silicone (Experiment II).
3. If applying an additional layer of UV-activator on top of the primer, both primers give good adhesion to the silicone without heating up the substrate (Experiment III).

Experiment III shows that a significant improvement of the adhesion to the silicone can be achieved when adding a thin layer of UV activator on top of the primers. These results lead to the conclusion that a simple way has been found to obtain strong adhesion to UV-curing silicones without the need of introducing a thermal heating step and without the need of developing tailor-made primers for UV-curing silicones.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of producing a layer of a UV-cured silicone rubber composition on a substrate surface to obtain an electrical insulator, the method comprising:
    applying a silicone primer composition comprising at least one UV-sensitive crosslinking catalyst to the substrate surface,
    followed by applying a UV-curable silicone rubber composition on the silicone primer composition, and UV-curing said UV-curable silicone rubber composition,
    wherein the at least one UV-sensitive crosslinking catalyst initiates and promotes curing of the UV-curable silicone rubber composition,
    wherein the UV-sensitive crosslinking catalyst is formed from at least one metal selected from the group consisting of iron, ruthenium, osmium, cobalt, rhodium, iridium, nickel, palladium and platinum.

2. The method according to claim 1, wherein said UV-curable silicone rubber composition applied to the surface of the hardened silicone primer composition is a room temperature UV-curable silicone rubber composition.

3. The method according to claim 1, wherein the primer composition comprises compounds selected from a hydrolysable silicate, a hydrolysable titanate, a reactive silane, a siloxane and an organic solvent.

4. The method according to claim 3, wherein the primer composition comprises an organic solvent selected from the group consisting of an aliphatic hydrocarbon, a linear ($C_4$-$C_8$)-alkane, a ($C_4$-$C_8$)-isoalkane, a ketone, benzene, toluene, xylene and ethylbenzene.

5. The method according to claim 1, wherein the primer composition contains a hydrolysable silicate selected from the group consisting of a tetra[($C_1$-$C_8$)-alkyl]-orthosilicate, tetraethyl-silicate, tetrapropyl-orthosilicate, tetrabutyl-orthosilicate, a ($C_1$-$C_8$)alkoxy-($C_1$-$C_8$)alkyl-orthosilicate, and butoxy-ethyl-orthosilicate.

6. The method according to claim 1, wherein the primer composition contains a hydrolysable titanate selected from the group consisting of a tetra[($C_1$-$C_8$)-alkoxy]-titanate, tetra[propoxy]-titanate, tetra-[n-butoxy]-titanate, a ($C_1$-$C_8$) alkoxy-($C_1$-$C_8$)alkyl-titanate, and butoxy-ethyl-titanate.

7. The method according to claim 1, wherein the primer composition contains a reactive silane selected from the group consisting of a tetraalkoxysilane, trialkoxyalkylsilane, and dialkoxyalkylsilane of the formula $$[(C_1\text{-}C_4)\text{alkoxy}]_x Si[C_1\text{-}C_4)\text{alkyl}]_{4-x}$$

wherein x is 2, 3 or 4.

8. The method according to claim 7, wherein the reactive silane is a tetraalkoxysilane, trialkoxy-monoalkylsilane, tetraethoxysilane, tetrapropoxysilane, triethoxymethylsilane, or tripropoxymethylsilane.

9. The method according to claim 1, wherein the primer composition contains a reactive siloxane that is a polydimethylsiloxane containing at least one reactive group per molecule.

10. The method according to claim 9, wherein the polydimethylsiloxane contains at least two reactive groups per molecule, said reactive groups being selected from the group consisting of an ethoxy group, a propoxy group and a butoxy group.

11. The method according to claim 9, wherein the reactive group of the polydimethylsiloxane is an alkoxy group or a hydroxy group or a vinyl group or an epoxy group.

12. The method according to claim 1, wherein the UV-sensitive crosslinking catalyst is formed from at least one of ruthenium, osmium, cobalt, rhodium, iridium, nickel, palladium and platinum, and wherein the UV-sensitive catalyst is present in a heterogeneous form, or as a chemical compound or as a complex of the metal.

13. The method according to claim 12, wherein the UV-sensitive catalyst consists of the at least one metal.

14. The method according to claim 12, wherein the at least one metal is deposited on a carrier material selected from the group consisting of charcoal, silica and alumina.

15. The method according to claim 1, wherein the UV-sensitive catalyst is made from at least one metal selected from the group consisting of rhodium, palladium and platinum, and is present in a heterogeneous form or as a chemical compound or as a complex of the at least one metal.

16. The method according to claim 1, wherein the UV-sensitive catalyst is present in a heterogeneous form of the metal.

17. The method according to claim 1, wherein the UV-sensitive catalyst is a heterogeneous platinum catalyst.

18. The method according to claim 1, wherein the UV-sensitive catalyst is a platinum(0) or platinum(II) compound.

19. The method according to claim 1, wherein the UV-sensitive catalyst is a chloroplatinic acid in anhydrous form or as hexahydrate, or a platinum Pt(0) or Pt(II) complex which has at least one ligand selected from the group consisting of a halide, a ($C_1$-$C_8$)alkyl radical, a ($C_1$-$C_8$) aliphatic unsaturated radical, an aliphatic unsaturated organosilane, and an aliphatic unsaturated organopolysiloxane.

20. The method according to claim 1, wherein the UV-sensitive catalyst is selected from the group consisting of tetrakis(triphenylphosphino)palladium; a complex of tetrakis(triphenylphosphino)palladium with a ligand selected from the group consisting of tri-(2-tolyl)phosphine, tris-(2-furyl) phosphine and tris(tert-butyl)phosphine; a complex of tetrakis(triphenylphosphino)palladium with a two-valent ligand selected from the group consisting of dppm and dppe; $PdCl_2$; $Pd(dppe)Cl_2$; $Pd(OAc)_2$; $Pd(dppe)(OAc)_2$; a π-allyl-Pd-complex; a di-acetylacetonate complex of Pd, Pt or Ni; and a trimethyl-(cyclopentadienyl)complex of Pt(IV).

21. The method according to claim 1, wherein said primer composition contains said UV-sensitive catalyst in an amount within the range of 50 ppm to 500 ppm, calculated to the weight of metal contained in the catalyst and the weight of the silicone primer composition, calculated without solvent(s).

22. The method according to claim 1, wherein the silicone rubber composition applied onto the hardened silicone primer composition is vulcanized with a combined use of UV-irradiation and IR-irradiation, optionally additionally with ultrasound.

23. The method according to claim 1, wherein the substrate surface is a metal, a glass, a ceramic or a synthetic polymer.

24. An electrical article comprising an electrical insulator formed from the method according to claim 1.

25. The method according to claim 1, wherein said UV-curable silicone rubber composition applied to the surface of the hardened silicone primer composition is a room temperature UV-curable liquid silicone rubber composition.

26. The method according to claim 1, wherein the substrate surface is aluminum, an aluminum alloy, or a chromium/nickel-steel.

27. A method of producing an electrical insulator in a form of a layer of a vulcanized silicone rubber composition on a substrate surface, the method comprising:
applying a silicone primer composition comprising at least one UV-sensitive crosslinking catalyst to the substrate surface,
followed by applying a UV-curable curable silicone rubber composition on the silicone primer composition, and curing said UV-curable curable silicone rubber composition, to obtain an electrical insulator,
wherein the at least one UV-sensitive crosslinking catalyst initiates and promotes vulcanization of the UV-curable silicone rubber composition,
wherein the UV-sensitive crosslinking catalyst is formed from at least one metal selected from the group consisting of iron, ruthenium, osmium, cobalt, rhodium, iridium, nickel, palladium and platinum.

* * * * *